US012024371B2

(12) United States Patent
Pedretti et al.

(10) Patent No.: US 12,024,371 B2
(45) Date of Patent: Jul. 2, 2024

(54) MOBILE METHOD FOR PROCESSING ORGANICS AND SYSTEM

(71) Applicant: Scott Equipment Company, New Prague, MN (US)

(72) Inventors: Kevin Pedretti, Prior Lake, MN (US); Glen Jeurissen, Belle Plaine, MN (US); Richard Lucas, Jordan, MN (US)

(73) Assignee: Scott Equipment Company

( * ) Notice: Subject to any disclaimer, the term of this patent is extended or adjusted under 35 U.S.C. 154(b) by 696 days.

(21) Appl. No.: 17/210,077

(22) Filed: Mar. 23, 2021

(65) Prior Publication Data

US 2022/0048036 A1 Feb. 17, 2022

Related U.S. Application Data

(60) Provisional application No. 63/064,184, filed on Aug. 11, 2020.

(51) Int. Cl.
*B02C 21/02* (2006.01)
*B02C 13/13* (2006.01)
*B02C 23/08* (2006.01)
*B02C 23/14* (2006.01)
*B65G 43/08* (2006.01)
*B02C 13/286* (2006.01)

(52) U.S. Cl.
CPC .............. *B65G 43/08* (2013.01); *B02C 13/13* (2013.01); *B02C 21/02* (2013.01); *B02C 21/026* (2013.01); *B02C 23/08* (2013.01); *B02C 23/14* (2013.01); *B02C 2013/28609* (2013.01); *B02C 2013/28654* (2013.01)

(58) Field of Classification Search
CPC ....... B02C 21/02; B02C 21/026; B02C 23/02; B02C 23/08; B02C 23/14
See application file for complete search history.

(56) References Cited

U.S. PATENT DOCUMENTS

| | | | | | |
|---|---|---|---|---|---|
| 4,961,542 A | * | 10/1990 | Den Besten | ............ | B02C 21/02 241/101.77 |
| 5,294,065 A | * | 3/1994 | Harms | ...................... | B28C 9/04 241/101.8 |
| 5,322,792 A | * | 6/1994 | Peguy | ..................... | B02C 23/14 71/901 |
| 5,402,950 A | * | 4/1995 | Blair | ....................... | B02C 19/22 241/101.76 |

(Continued)

FOREIGN PATENT DOCUMENTS

| | | | | | |
|---|---|---|---|---|---|
| AT | 9102503 A | * | 1/1993 | ............ | B02C 21/02 |
| DE | 3708558 A1 | * | 8/1988 | ............ | B02C 23/08 |

(Continued)

*Primary Examiner* — Faye Francis
(74) *Attorney, Agent, or Firm* — Edwin E. Voigt, II

(57) ABSTRACT

A method of processing organics having a relocatable trailer transporting a hopper, an infeed conveyor, an organics separation unit, an organics conveyor, an inorganics waste conveyor, and a control panel between processing locations of organic material. The control panel regulates the operation of the infeed conveyor, the organics separation unit, the organics conveyor and the inorganics waste conveyor. Following completion of processing the components carried on the trailer may be cleaned and the trailer supporting the processing components may be moved to another processing location.

20 Claims, 5 Drawing Sheets

(56) References Cited

U.S. PATENT DOCUMENTS

| | | | |
|---|---|---|---|
| 5,887,808 A | 3/1999 | Lucas | |
| 6,248,156 B1 | 6/2001 | Lucas | |
| 6,527,209 B1 * | 3/2003 | Dorscht | B02C 21/02 241/101.76 |
| 6,713,112 B1 | 3/2004 | Lucas | |
| 6,935,588 B2 * | 8/2005 | Blair | B02C 21/02 241/101.76 |
| 8,714,467 B2 | 5/2014 | Lucas et al. | |
| 8,727,254 B2 | 5/2014 | Lucas et al. | |
| 9,174,219 B2 | 11/2015 | Lucas et al. | |
| 9,174,220 B2 | 11/2015 | Lucas et al. | |
| 9,434,533 B2 | 9/2016 | Lucas | |
| 2003/0141394 A1 * | 7/2003 | Ueda | B02C 21/026 241/73 |
| 2004/0076726 A1 | 4/2004 | Lucas | |
| 2004/0141877 A1 * | 7/2004 | Devine | A61L 11/00 241/606 |
| 2006/0113412 A1 * | 6/2006 | Umeda | B02C 18/24 241/101.74 |
| 2018/0161779 A1 * | 6/2018 | Kimbell | B02C 18/2241 |
| 2021/0001346 A1 | 1/2021 | Lucas | |

FOREIGN PATENT DOCUMENTS

| | | | |
|---|---|---|---|
| DE | 4019407 A1 * | 12/1991 | B02C 21/02 |
| EP | 0272624 A2 * | 6/1988 | |
| EP | 626204 A2 * | 11/1994 | A01G 1/125 |
| WO | WO-9302796 A1 * | 2/1993 | B02C 18/0076 |
| WO | WO-2004018106 A1 * | 3/2004 | B02C 21/02 |

* cited by examiner

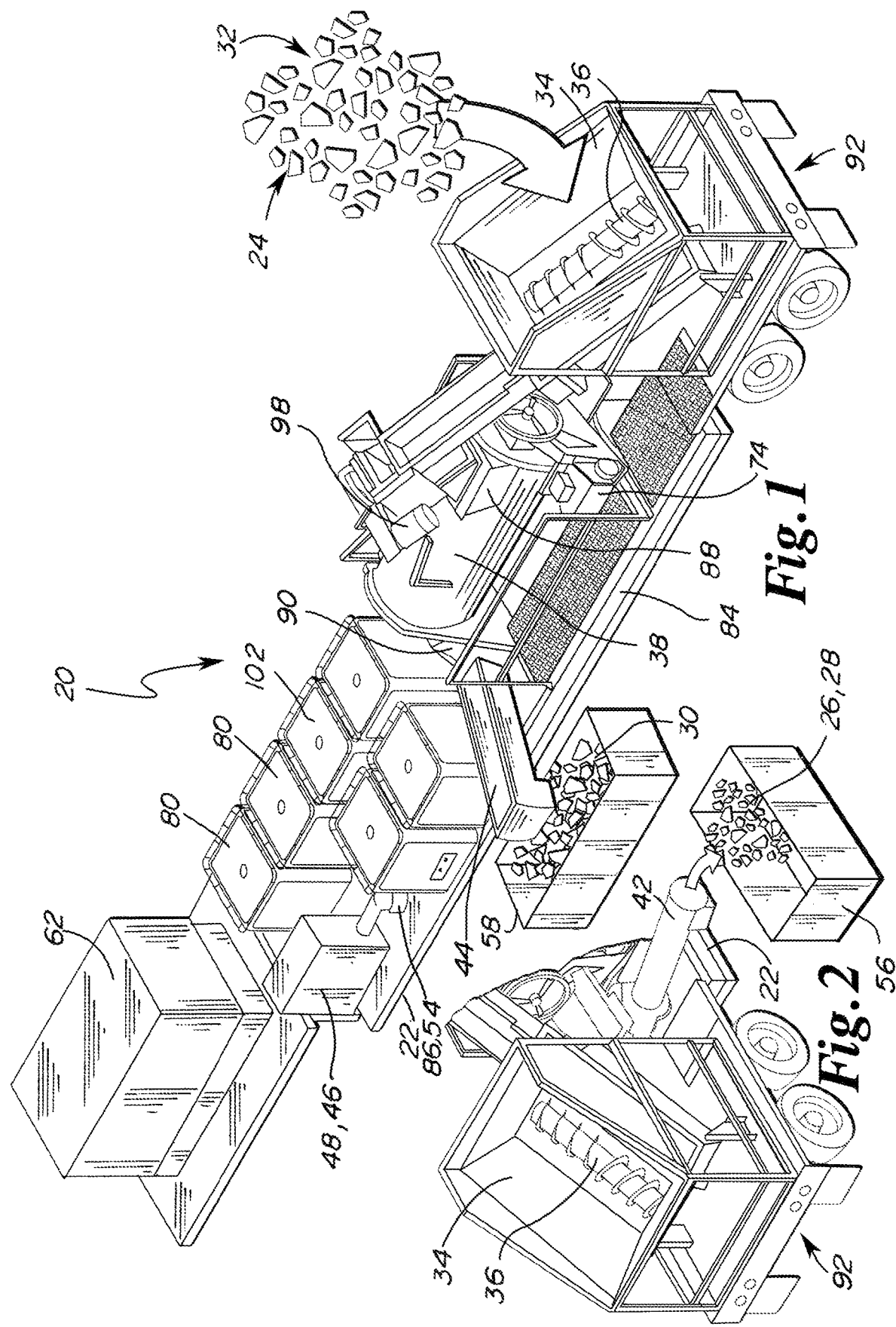

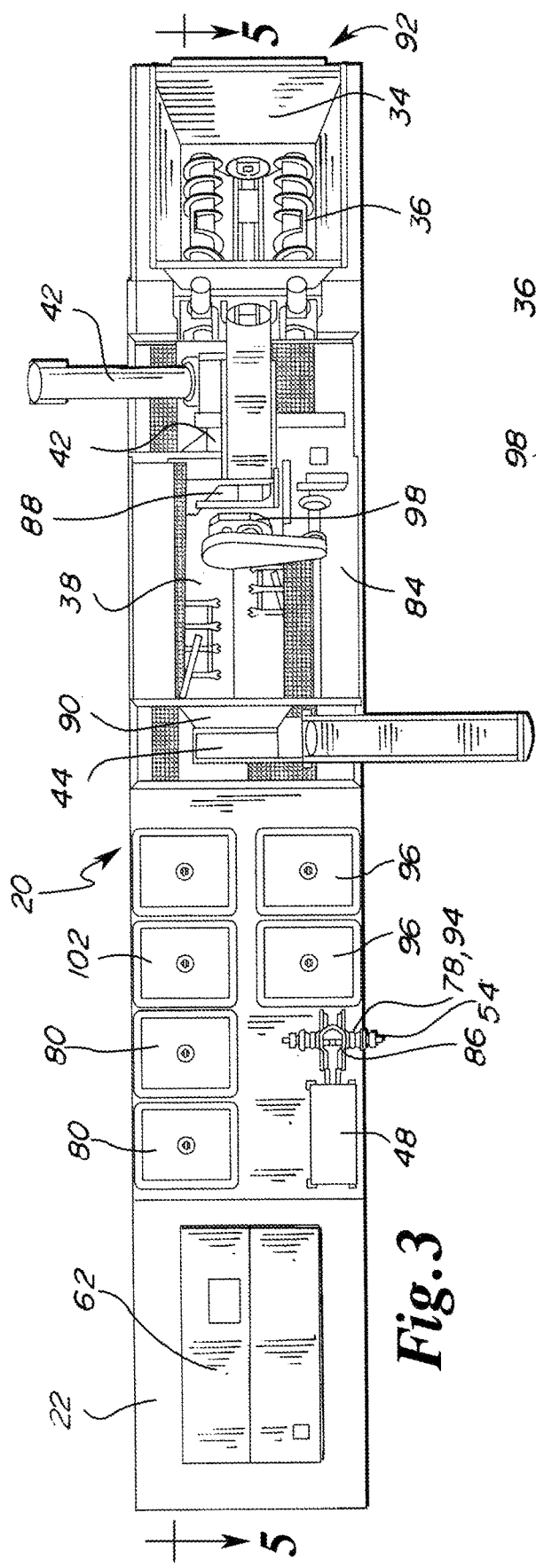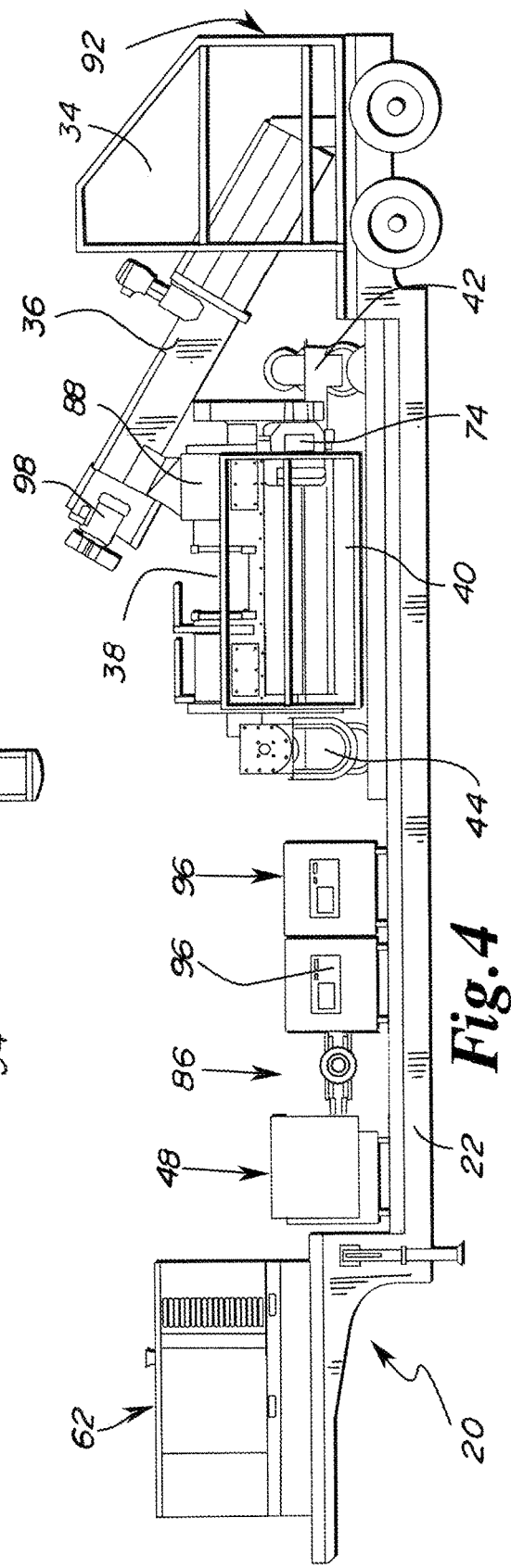
Fig.3
Fig.4

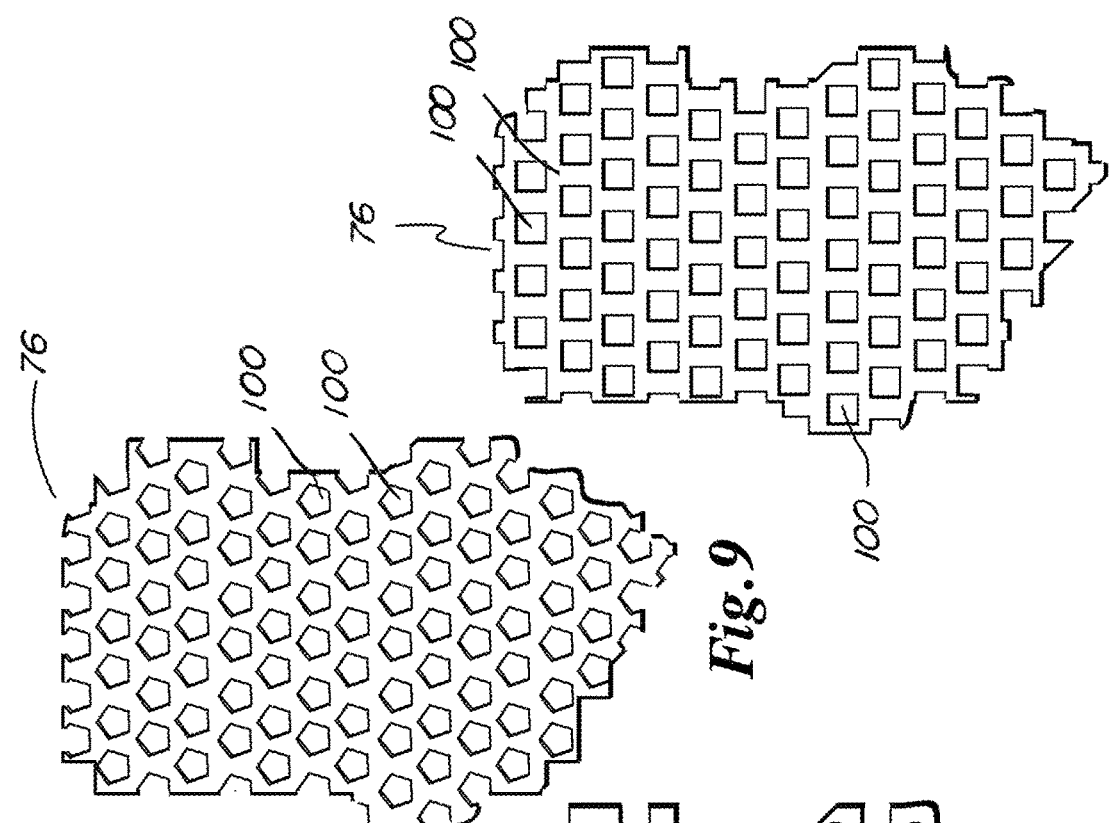
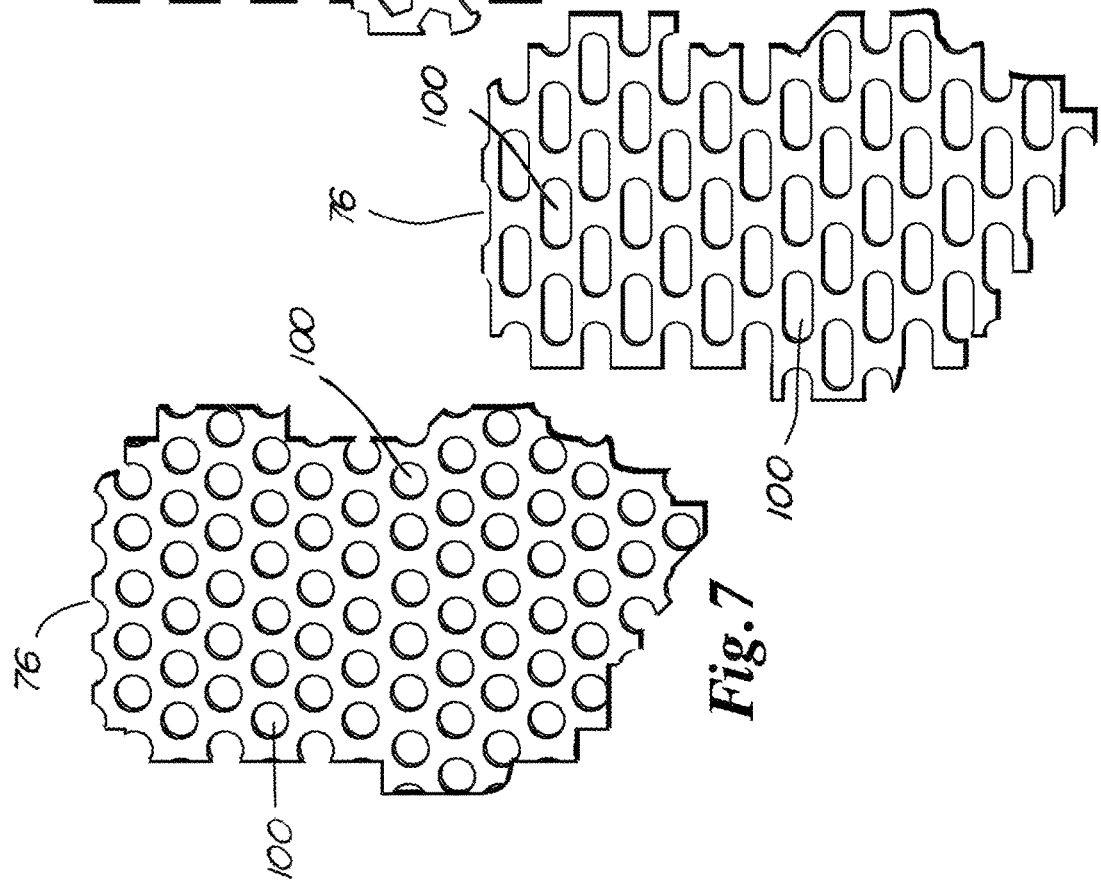

MOBILE METHOD FOR PROCESSING ORGANICS AND SYSTEM

CROSS-REFERENCE TO RELATED APPLICATIONS

This application claims the benefit of U.S. Provisional Patent Application Ser. No. 63/064,184 filed Aug. 11, 2020, which is incorporated by reference herein in its entirety.

FIELD OF THE INVENTION

The Mobile Method for Processing Organics and System is directed to the use of a mobile trailer transporting processing machinery and equipment to locations which would benefit from onsite recycling. The Mobile Method for Processing Organics and System separates source separated organics into wet and/or dry organic material(s), and inorganic materials, reducing land fill waste and carbon emissions into the atmosphere.

BACKGROUND

A variety of types and styles of separation equipment have been used for decades in order to process mixed organic and inorganic materials. Conventional methods of processing mixed organic and inorganic materials includes the use of shredders, trammels, screening machines, and screw presses to name a few. The known methods of processing mixed organic and inorganic materials attempt to break down the source separated organics into smaller pieces, and then extract the organics using a press, water slurry, or screening array.

A significant problem with the known techniques for processing source separated organics is that the machinery and equipment to effectuate processing on a commercially acceptable scale are very large and stationary. Source separated organics are therefore required to be transported in trucks over significant distances to the stationary processing equipment in order for processing to occur at a centralized location.

One problem with the known methods of processing mixed organic and inorganic materials is the shredding or reduction of the mixed organic and inorganic materials into pieces or particles of relatively uniform size, and then the separation of the inorganics from the organics. The use of some types of equipment causes the mixed organic and inorganic materials to be reduced to an insufficiently small size. In other instances, the known equipment fails to sufficiently reduce the size of the mixed organic and inorganic materials leaving the portions overly large. Separation of the inorganics from the organics in either instance, when the organics are of insufficient size, or alternatively the organics are too large, is problematic.

In other known methods, the combined organics and inorganics are initially reduced to a uniform size. A second processing procedure then attempts to separate the inorganics from the organics. Reprocessing of previously processed organics and inorganics to obtain separation wastes time and energy resources.

A further problem with the known methods to process mixed organic and inorganic materials, or otherwise known as source-separated organics, relates to the crossover of organic materials remaining with the inorganic materials after processing, or the inorganic materials remaining with the organic materials after processing. When both of the organics and inorganics have been reduced in size prior to separation procedures, it is common to have the collected organic fraction include inorganic material crossover or contamination in excess of 2% of the total material on average. In addition, it is common to have the collected inorganic fraction include organic material crossover or contamination in excess of 2% of the total material on average. In this instance both of the collected organic material and inorganic material output streams are unclean, and less desirable for further recycling of material or use.

The known systems for processing source separated organics require two or more individual machines, or items of equipment, to divide the source separated organics into organics and inorganics. The size of machinery required to provide a satisfactory commercial level of throughput does not allow the machinery to be mobile or transportable on a single trailer or roll off frame.

It is also energy inefficient to transport tons of source separated organics every day to a conventional processing facility which may require the use of numerous waste haulers, travel over significant miles of highway, the use of gallons of fuel, which also increases road congestion and vehicle air pollution.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

A mobile method of processing organics and system is mounted onto a trailer which in some embodiments may be a fifth wheel trailer; flatbed trailer; step deck trailer; double step deck trailer; cargo container; or roll off style frame.

In some embodiments the mobile method of processing organics and system processes, reduces and separate's source separated organics into wet and/or dry organic material(s) and inorganic materials in a single processing step.

In at least one embodiment materials to be processed and separated by the mobile method of processing organics and system include, but are not necessarily limited to, food waste, gypsum wallboard, personal care items, oil filters, coffee pods, liquid beverages or other types of materials where the recyclable materials are contained within another recyclable material.

In general the mobile method of processing organics and system includes a movable trailer having an infeed hopper, infeed conveyor, organics separation unit (Turbo Separator), organics collection hopper, organics screw conveyor, inorganics waste conveyor, pumping system, control panel, and onboard power generator. The onboard power generator in some embodiments may be an optional item of equipment.

In at least one embodiment the trailer may be transported and relocated to a site having accumulated source separated organics. The source separated organics may be positioned on flat or level ground, where a mechanical loading system, like a skid steer, fork truck, or front end loader may be used to transport the source separated organics for placement into the infeed hopper.

In another embodiment the trailer may be transported and relocated to a position adjacent to a dock, where the source separated organics may be pushed or loaded into the infeed hopper by hand, fork truck, or skid steer from the dock or elevated surface.

In one embodiment the source separated organics may be loaded into the infeed hopper which is located proximate to the tail or rear of the trailer. Alternatively the infeed hopper may be positioned proximate to the tail or rear side of the trailer.

In some embodiments an infeed conveyor may provide some initial size reduction for the source separated organics during the transfer of the source separated organics materials into the organics separation unit or turbo separator.

In one preferred embodiment, the turbo separator would simultaneously reduce the size of the source separated organics and separate the source separated organics into a recovered organics stream and a recovered inorganics stream. In some embodiments the recovered organics stream may include at least a portion of the organics being in the form of a liquid or as wet organic material.

In some embodiments, if a portion of the separated organics exiting from the turbo separator include wet organic material, then the liquid portion of the wet organic material may be collected by passing through the organics collection hopper and into the organics conveyor. A flanged hose, may be in fluid flow communication with an onboard pumping system and the organics conveyor for pumping of liquid organics to a different location on the trailer.

If the separated and recovered organics material includes dry organic material or dry organic material and wet organic material, which is incapable of flowing freely as a liquid, then the non-free-flowing liquid recovered organic material and dry organic material following processing may be moved by an organics conveyor to an organics container which is proximate, but not connected to the trailer.

In some embodiments, recovered inorganics would be discharged from the organics separation unit into an inorganics waste conveyor. The inorganics waste conveyor would then move and discharge the recovered inorganics material into an adjacent waste collection container which is proximate, but not connected to the trailer.

In a preferred embodiment the mobile method of processing organics and system as transported on a trailer will have size and weight specifications complying with the requirements and/or regulations of a Department of Transportation (DOT) for an approved trailer body.

In at least one embodiment the mobile method of processing organics and system as transported on a trailer will contain a retractable tarp system to minimize environmental exposure to the components forming the mobile method of processing organics and system. In an alternative embodiment the mobile method of processing organics and system may be located within the interior of and may be transported within a standard shipping container.

In some embodiments, the source separated organics may be formed of materials which are separately collected from typical waste streams, such as green waste and municipal solid waste.

In some embodiments, restrictions exist within the waste collection industry to comply with the growing demand for the diversion of source separated organics away from landfills. Therefore, the mobile method of processing organics and system may be adapted to meet the needs of a small, medium, and large source separated organics producers or recyclers. The components for the mobile method of processing organics and system may be increased or decreased in size or capacity, and may be deployed at a convenient site or location, in order to improve the processing by source separated organics collectors or producers in replacement of stationary regional organics processing centers.

In some embodiments, following the transportation of the mobile method of processing organics and system to a new location, an onsite power source may be connected to the system components. Power may also be supplied through the use of a portable generator, or power may be provided from an onboard diesel generator.

In at least one embodiment the source separated organics collector or producer supplies the collection containers for processed organic materials. Alternatively, intermediate bulk containers or woven supper sacks may be used to collect the separated organics. The source separated organics collector or producer also supplies the collection containers for the separated inorganic material.

The mobile method of processing organics and system initiates by the activation of the processing components from a control panel, and turning each component of the system on in a designated or random order, one component at a time. Source separated organics are then deposited into the infeed hopper by hand or through the use of a fork truck, skid steer, or front end loader. The source separated organics material would be moved by the infeed conveyor which may be an electric motor belt driven conveyor, or an electric motor driven screw conveyor, to move the source separated organic material to the infeed inlet of the organics separation unit. The infeed conveyor may be a single, double, triple, or quad conveyor assembly. Alternatively the source separated organics material may be fed into a chute leading to the infeed inlet for the organics separation unit.

The source separated organics material is then processed inside the organics separation unit. The organics separation unit may be a turbo separator having an exterior body defining an internal processing chamber, a horizontal shaft longitudinally traversing the processing chamber, and paddles extending outwardly from the horizontal shaft. The horizontal shaft is fitted with a predesigned type, size, shape and/or number of adjustable paddles as required for a particular application. The horizontal shaft may rotate at a rate of between 300 and 600 rotations per minute (RPM) with the aid of a electric motor, sheave, and belt. The organics separation unit processes and reduces the source separated organics material in constituent parts of wet organic material, dry organic material, and inorganic material.

The organics separation unit processing chamber has a lower portion. The lower portion is formed of a series of curved perforated plates or screens which allow the wet and dry organic material to pass downwardly therethrough. The series of curved perforated plates or screens have openings which are sized for a particular application to restrict the flow or passing of the inorganic material through the curved perforated plates or screens. After the wet and dry organic material passes downwardly through the curved perforated plates or screens the wet and dry organic material enters an organics collection hopper and gravity causes the wet and dry organic material to drop onto an electrically powered organics conveyor. The organic material is then conveyed by the organics conveyor away from the mobile method of processing organics and system into collection tote or off board organics container.

The organics separation unit at the opposite end from the infeed inlet has an inorganics outlet. The rotation of the horizontal shaft and paddles sweep the inorganic material into the airflow within the processing chamber and expel the inorganics material from the processing chamber into the inorganics outlet chute. The expelled inorganics material then drops by gravity onto the inorganics conveyor. The inorganics materials are then transferred away from the mobile method of processing organics and system by the inorganics conveyor for collection in a waste inorganics container.

Source separated organics material is deposited into the infeed hopper for processing until such time as the materials to be processed is exhausted.

The organics container and/or the waste inorganics container may be placed onto the trailer for site removal, or the organics container and/or the waste inorganics container may remain with the source separated organics collector, producer or recycler for additional processing.

The components of the mobile method of processing organics and system may then cleaned, washed and prepared for transportation to the next location.

In some embodiments the mobile method of processing organics and system may include a cleaning system including an onboard water supply and commercial pressure washer to clean and wash any source separated organics, dry or wet organic material and/or inorganic material residue from the processing unit and/or conveyors, preventing undesirable release of any remaining source separated organics, dry or wet organic material and/or inorganic material onto a roadway during transportation to another processing location.

The some embodiments a larger scale mobile method of processing organics and system may have collection pans and pump to secure, collect, and transfer wash liquids to an onboard intermediate bulk container, or to a source separated organics collector, producer or recycler drainage system.

In some embodiments the trailer cover may retractably slid on a rail system over the entire length of the trailer, to protect the system from prolonged environmental exposure to the elements.

In some embodiments the transportation of the mobile method of processing organics and system to the locations of source separated organics producers reduces carbon emissions caused by the traditional method of transporting the source separated organics to a stationary regional processing facility.

Rather than bringing hundreds of tons of source separated organics to a conventional regional processing facility on a daily basis, requiring the use of numerous waste haulers, travel and wear upon miles of highway, and consumption of gallons of fuel, and increasing road congestion, the mobile method of processing organics and system may be moved between facilitates to economically and environmentally recycle source separated organic materials.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

Various other objects, features and attendant advantages of the present invention will become fully appreciated as the same becomes better understood when considered in conjunction with the accompanying drawings, in which like reference characters designate the same or similar parts throughout the several views, and wherein:

BRIEF DESCRIPTION OF THE DRAWINGS

FIG. 1 is an isometric perspective view of one alternative embodiment of the mobile method of processing organics and system;

FIG. 2 is a detail partial isometric perspective view of one alternative embodiment of the rear of the trailer, infeed hopper, and infeed conveyor of the mobile method of processing organics and system;

FIG. 3 is top plan view of one alternative embodiment of the mobile method of processing organics and system;

FIG. 4 is a side elevation view of one alternative embodiment of the mobile method of processing organics and system;

FIG. 7 is a detail, partial, top plan view, of one alternative embodiment of the curved perforated plates or punch screens of the organics separation unit of the mobile method of processing organics and system;

FIG. 8 is a detail, partial, top plan view, of one alternative embodiment of the curved perforated plates or punch screens of the organics separation unit of the mobile method of processing organics and system;

FIG. 9 is a detail, partial, top plan view, of one alternative embodiment of the curved perforated plates or punch screens of the organics separation unit of the mobile method of processing organics and system;

FIG. 10 is a detail, partial, top plan view, of one alternative embodiment of the curved perforated plates or punch screens of the organics separation unit of the mobile method of processing organics and system.

DETAILED DESCRIPTION OF THE PREFERRED EMBODIMENTS

Figure 6:
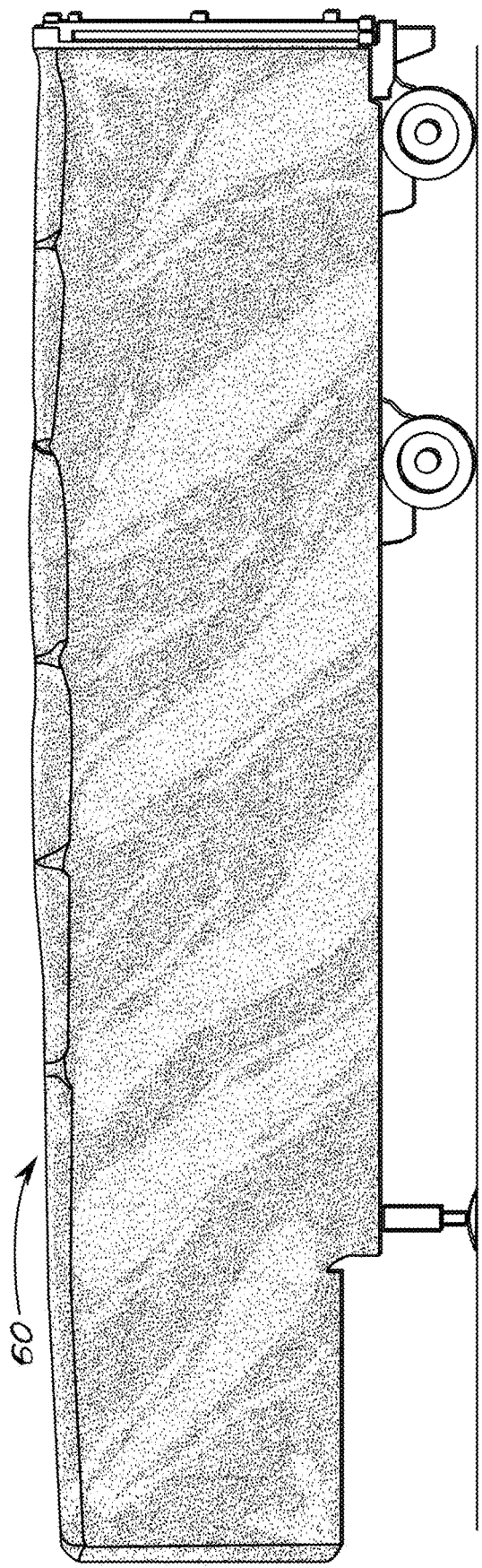
FIG. 6 is a side elevation view of one alternative embodiment of the retractable tarp in an operative position covering the mobile method of processing organics and system.
Figure 5:
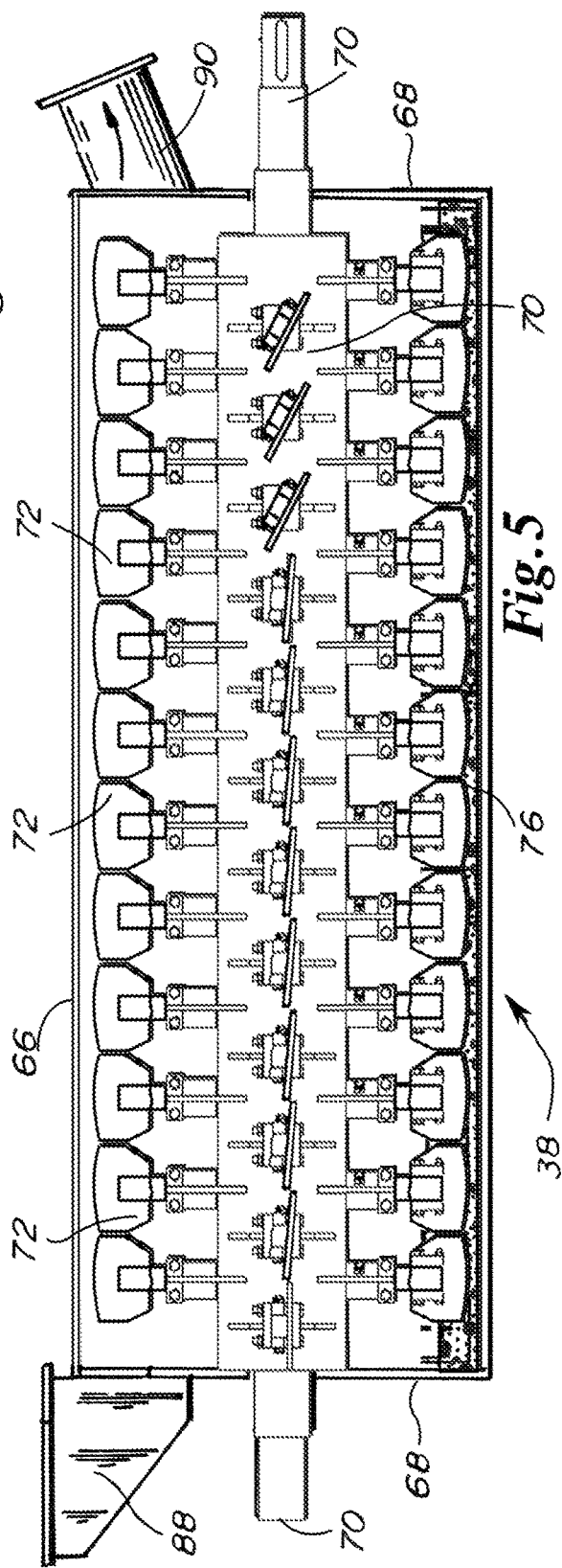
FIG. 5 is a partial detail cross-sectional side view of one alternative embodiment of the organics separation unit of the mobile method of processing organics and system taken along the line 5-5 of FIG. 3.

Referring generally to FIG. 1 through FIG. 10, a mobile method of processing organics and system 20 is preferably mounted upon, and is transportable between many locations through the use of a trailer 22, fifth wheel trailer, flatbed trailer, step deck trailer, double step deck trailer, cargo container, or roll off style frame. The mobile method of processing organics and system 20 is used for processing, reducing and separating source separated organics 24 into wet organic material(s) 26 and/or dry organic material(s) 28 and inorganic material(s) 30. Examples of wet organic material(s) 26 and/or dry organic material(s) 28 include but not necessarily limited to food waste, gypsum wallboard, and personal care items, oil filters, coffee pods, green waste, municipal solid waste or liquid beverages to name a few of the many types of materials subject to recycling through the use of the mobile method of processing organics and system 20. Frequently the materials to be processed, reduced and/or separated by the mobile method of processing organics and system 20, are initially contained within another recyclable material 32.

In general the mobile method of processing organics and system 20 includes individual components of an infeed hopper 34, an infeed conveyor 36, an organics separation unit 38 which may be a turbo separator, an organics collection hopper 40, an organics conveyor 42, an inorganics waste conveyor 44, a pumping system 46 and a control panel 48.

In at least one embodiment, during use of the mobile method of processing organics and system 20, the trailer 22 is positioned near an accumulation of source separated organics 24, which is disposed on a flat, level ground or other surface, where a mechanical loading system, one example of which is a skid steer, fork truck, or front end loader, would be used to transport and load the source separated organics 24 into the infeed hopper 34.

In an alternative embodiment, the rear 92 of the trailer 22 may be positioned adjacent to a loading dock or other elevated surface where the source separated organics 24 may be loaded into the infeed hopper 34 by hand, or through the use of a fork truck or skid steer.

In an alternative embodiment, a skid steer, fork truck, or front end loader, or other mechanical device such as a conveyor or screw conveyor may be used to load source separated organics 24 into the infeed hopper 34 from either of the opposite sides of the trailer 22.

With reference to FIG. 1 through FIG. 3, the infeed hopper 34 may be formed of a rigid mounted support framework designed to support a straight walled or tapered hopper housing intended to receive unseparated and unprocessed source separated organics 24 material. In one alternative embodiment, a tote mover and/or tote tipper may be used to move pallets or containers of unseparated and unprocessed source separated organics 24 material to a location adjacent to the infeed hopper 34. Upon the placement of a tote mover into a desired position on the tote tipper, the tote tipper may be activated to safety deposit the unseparated and unprocessed source separated organics 24 material into the infeed hopper 34.

The infeed hopper 34 is preferably manufactured from either mild carbon steel or stainless steel alloy material. However other materials may be used provided that the infeed hopper 34 is formed of sufficiently sturdy material to not fracture or fail to perform its intended purpose during use of the mobile method of processing organics and system 20. The volume of the infeed hopper 34 may vary and is dependent on the model and size of the mobile method of processing organics and system 20. The infeed hopper 34 holds the unseparated and unprocessed source separated organics 24 material until such time as the infeed conveyor 36 draws the material from the bottom of the infeed hopper 34 and onto the infeed conveyor 36 for transport and deposit into the infeed inlet 88 of the organics separation unit 38.

In at least one embodiment gravity causes the source separated organics 24 to drop through the infeed hopper 34 and onto the infeed conveyor 36. The infeed conveyor 36 transports the source separated organics 24 to the organics separation unit 38.

In one embodiment the infeed conveyor 36 may be a screw conveyor, a double screw conveyor, triple screw conveyor or quad screw conveyor at the preference of an individual. Alternatively the infeed conveyor 36 may be an elongate belt which may optionally include regularly spaced perpendicular transfer ledges to facilitate movement of the source separated organics 24 to the organics separation unit 38.

In at least one embodiment, the infeed conveyor 36 may provide some initial size reduction for the source separated organics 24 when the infeed conveyor 36 is one of the many types of screw conveyors.

In some embodiments, infeed conveyor 36 may be a belt conveyor (smooth, textured, or cleated), or drag paddle conveyor.

The capacity of the infeed conveyor 36 may vary, and is customized dependent upon the mobile method of processing organics and system 20 specifications, and the type and the size of the unseparated and unprocessed source separated organics 24 material to be processed. In one embodiment, when the infeed conveyor 36 includes a screw conveyor, then the pitch of the infeed conveyor 36, and the materials used for the construction of the infeed conveyor 36, will be determined by the specifications of the particular application and the source separated organics 24 processing requirements.

The infeed conveyor 36 is preferably powered by an electrical infeed conveyor motor 98. The infeed conveyor motor 98 has variable speeds and an individual may incrementally increase or decrease the rotations per minute or the feet per minute, to adjust the feeding rate of the source separated organics 24 material into the infeed inlet 88 and the organics separation unit 38. The variable speed of the infeed conveyor motor 98 may be adjusted through manipulation of the appropriate elements of the control panel 48.

In a preferred embodiment, the infeed conveyor 36 and the infeed conveyor motor 98, as well as components of the infeed conveyor motor 98 such as the screw, belt, bearings, and materials used in the construction on the infeed conveyor 36, are sufficiently durable and are suitable for use in outdoor environments.

The infeed conveyor 36 will be mounted and secured to the trailer 22 and may include any desired type of support structure as necessitated by the design of the mobile method of processing organics and system 20. In at least one embodiment the location of the infeed conveyor 36 is fixed relative to the trailer 22. In another embodiment the infeed conveyor 36 may be rotated in a desired direction outwardly relative to the trailer 22. In a further embodiment the infeed conveyor 36 may be mounted upon a bearing assembly and may be drawn in an outward direction relative to the trailer 22.

In a preferred embodiment the organics separation unit 38 processes, reduces and separates the source separated organics 24 into two distinct material streams, namely the recovered wet organic material 26 and/or dry organic material 28 in a first stream, and the recovered inorganic material 30 in the second stream.

In at least one embodiment when the source separated organics 24 includes wet organic material 26 in a liquid form, the wet organic material 26 will be collected downwardly through the organics collection hopper 40 and into the organics conveyor 42. A hose 94 will be connected to the organics conveyor 42 to transfer the liquid organic material 26. The hose 94 may include a flanged hose connection 54. The flanged hose connection 54 may be in liquid communication with an onboard pumping system 46. The onboard pumping system 46 may also be used when the source separated organics 24 are formed of an organic slurry which is to be processed and collected.

In some embodiments when the wet organic material 26 does not freely flow as a liquid, then the processed wet organic material 26 and/or dry organic material 28 will pass downwardly from the organics separation unit 38 and through the organics collection hopper 40 and onto the organics conveyor 42 (which may be a screw conveyor) for transport into an adjacent recovered organics container 56. The organics container 56 will generally be disposed proximate to, but will not be connected to the mobile method of processing organics and system 20.

The processed inorganic material 30 in some embodiments will be discharged from the organics separation unit 38 and onto an inorganics waste conveyor 44. The inorganics waste conveyor 44 will transport the recovered inorganic material 30 into an adjacent waste inorganics container 58. The waste inorganics container 58 will generally be disposed proximate to, but will not be connected to the mobile method of processing organics and system 20.

The organics separation unit 38 mechanically separates the source separated organics 24 material into the inorganic material 30 and the organic material formed of the dry organic material 28 and the wet organic material 26. In some embodiments the dry organic material 28 may include primary organics and waste organics. One of the many examples of waste organics may be gypsum as obtained from the reduction of gypsum wallboard during processing within the organics separation unit 38.

In at least one embodiment, the organics separation unit 38 includes a body having a horizontal, tubular processing chamber 66 with opposite vertical ends. The upper half of the body 66 includes a combination of mechanically bolted access doors to allow for maintenance of the organics separation unit 38.

In a preferred embodiment the organics separation unit 38 includes an infeed inlet 88, which is aligned with, and is disposed proximate to, and below, the working end of the infeed conveyor 36. Gravity drops the source separated organics 24 from the working end of the infeed conveyor 36 into the infeed inlet 88 for entry into the interior of the organics separation unit 38.

In at least one embodiment a horizontal shaft 70 is positioned centrally with respect to, and extends horizontally between, the opposite ends of the body 66. The horizontal shaft 70 is in communication with an electric shaft motor 74 which rotates the horizontal shaft 70 at high speeds on a horizontal axis of the organics separation unit 38.

In at least one embodiment, the horizontal shaft 70 is centrally and externally supported on the opposite ends through the use of a bearing and seal on each of the opposite ends. The opposite bearings and seals supporting the horizontal shaft 70 mitigate dust, liquid exposure and/or exposure to contaminants to the opposite bearings, seals, and ends of the horizontal shaft 70. Abrasion exposure to the rotating horizontal shaft 70 is minimized, prolonging the useful life of the horizontal shaft 70, opposite bearings and seals. The opposite bearings and seals further reduce maintenance requirements for the rotating horizontal shaft 70 during processing of the source separated organics 24.

A variable speed electric shaft motor 74 is used to power the rotating horizontal shaft 70. Power may be transferred from the variable speed electric shaft motor 74 to the rotating horizontal shaft 70 through the use of a belt drive. The variable speed electric shaft motor 74 is in electrical communication with and is operated by the control panel 48.

In at least one alternative embodiment, the organics conveyor 42 may be driven by a hydraulic system.

The horizontal shaft 70 is fitted with a predesigned type, size, shape and/or number of adjustable paddles as required for a particular application. The horizontal shaft may rotate at a rate of between 300 and 600 rotations per minute (RPM) with the aid of the variable speed electric motor, sheave, and belt. The control panel 48 may be used to either increase the rotations per minute or to decrease the rotations per minute of the shaft 70 to any value above, below or in between the range of 300 and 600 rotations per minute. The organics separation unit 38 processes and reduces the source separated organics material 24 into constituent parts of wet organic material 26, dry organic material 28, and inorganic material 30.

In at least one alternative embodiment a plurality of paddles 72 extend perpendicularly outward from the rotating horizontal shaft 70. The plurality of paddles 72 may be organized into sections or groups. The plurality of paddles 72 may have the same head shape, length, or width dimensions, or alternatively may have different shaped heads, or length, or width dimensions dependent on the source separated organics 24 materials to be processed. In addition, one or more of the plurality of paddles 72 may be temporarily or permanently removed, rotated, or extended to improve the separation efficiency of the organics separation unit 38.

Further discussion related to the wet organic material 26, dry organic material 28, inorganic material 30, infeed hopper 34, infeed conveyor 36, organics separation unit 38, organics collection hopper 40, organics conveyor 42, inorganics waste conveyor 44, body 66, ends, rotating horizontal shaft 70, electric shaft motor 74, curved perforated plates or punch screens 76, infeed inlet 88, inorganics outlet chute 90, infeed conveyor motor 98, openings 100 and/or the plurality of paddles 72 or other elements of the invention may be found in one or more of U.S. Pat. No. 9,174,220, issued Nov. 3, 2015; U.S. Pat. No. 9,174,219, issued Nov. 3, 2015; U.S. Pat. No. 8,727,254, issued May 20, 2014; U.S. Pat. No. 8,714,467, issued May 6, 2014; U.S. Pat. No. 6,713,112, issued May 3, 2004; and U.S. Pat. No. 6,248,156, issued Jun. 19, 2001, the entire contents all of which being incorporated by reference herein in their entireties.

The lower half of the body 66 of the organics separation unit 38 preferably has a series of cutouts for receipt of curved perforated plates or punch screens 76. Some visual examples of the many different types or styles of curved perforated plates or punch screens 76 are depicted in FIGS. 7 through 10.

A plurality of curved perforated plates or punch screens 76 are located directly below the horizontal shaft 70. The curved perforated plates or punch screens 76 function to restrict the flow of the non-liquid wet organic material 26 and the dry organic material 28 downwardly from the organics separation unit 38 and into the organics collection hopper 40 until the wet organic material 26 and dry organic material 28 has been reduced to a desired size dimension. The curved perforated plates or punch screens 76 prolong the exposure of the non-liquid wet organic material 26 and the dry organic material 28 to the rotating paddles 72 during processing. Increasing the duration of the exposure of the non-liquid wet organic material 26 and the dry organic material 28 to the rotating paddles 72 reduces the size of the individual portions of the non-liquid wet organic material 26 and the dry organic material 28 until such time the particle size is sufficiently small to pass downwardly through the openings 100 through the curved perforated plates or punch screens 76.

The curved perforated plates or punch screens 76, in at least one embodiment, are arcuate in shape, and the arc of the curved perforated plates or punch screens 76 is identical to the arc of the body 66 of the organics separation unit 38.

The curved perforated plates or punch screens 76 may be mechanically secured proximate to the lower portion of the interior of the organics separation unit 38. In certain embodiments the curved perforated plates or punch screens 76 are releasably secured to the interior of the organics separation unit 38. In this embodiment the curved perforated plates or punch screens 76 may be replaceable. Alternatively, another curved perforated plate or punch screen 76 having a different size, shape, pattern, formation, or grouping of openings 100 may be substituted, replacing the existing curved perforated plates or punch screen(s) 76 for the organics separation unit 38.

In at least one embodiment the curved perforated plates or punch screens 76 are formed of metal material and preferably steel. The curved perforated plates or punch screens 76 may have any desired length, width or thickness dimensions dependent on the dimensions selected for the organics separation unit 38 and the source separated organics 24 materials to be processed. The openings 100 may have and desired size, shape, pattern, groupings, organization or formation as required for processing of a particular type of source separated organics 24 materials.

In some embodiments, the openings 100 may have identical dimensions. Alternatively, any individual, number, pattern, combination, grouping, or other selection of openings 100 may have identical, alternative, or different dimensions or shape as required for processing of a particular type of source separated organics 24 materials. FIG. 7 through FIG. 10 show a very limited number of an almost infinite variety of alternative configurations for the openings 100 of the curved perforated plates or punch screens 76. FIG. 7 through FIG. 10 should not be considered to be limiting as to the variety of types, size dimensions, configurations, or groupings of openings 100 found in the curved perforated plates or punch screens 76 for use within the organics separation unit 38.

The organics collection hopper 40 is positioned directly below the curved perforated plates or punch screens 76 on the trailer 22. The non-liquid wet organic material 26 and the dry organic material 28 which has been processed and reduced in size by the rotating paddles 72 falls downwardly from the organics separation unit 38 through the curved perforated plates or punch screens 76 and into the organics collection hopper 40 by gravity. The organics collection hopper 40 preferably has four sides and has an opening dimension which is larger than the dimension of the curved perforated plates or punch screens 76.

In at least one embodiment, the organics collection hopper 40 functions as a shroud relative to the curved perforated plates or punch screens 76. The organics collection hopper 40 may funnel the wet organic material 26 and/or dry organic material 28 directly into an organics container 56. Alternatively, the organics collection hopper 40 may funnel the wet organic material 26 and/or dry organic material 28 onto an organics conveyor 42 for transportation of the wet organic material 26 and/or dry organic material 28 to, and for placement within, an organics container 56.

In at least one embodiment, the organics collection hopper 40 is mechanically fastened to the underside of the organics separation unit 38 directly below the curved perforated plates or punch screens 76. Generally the organics collection hopper 40 is formed of the same type of metallic materials as are used to form the organics separation unit 38 which is preferably steel or stainless steel. In addition, in most mobile method of processing organics and systems 20 the organics collection hopper 40 is mechanically secured or fastened to the organics conveyor 42.

In at least one embodiment the organics separation unit 38 may include a stand and/or work platform to facilitate maintenance on one or both sides of the organics separation unit 38.

The organics conveyor 42 may be a screw type of conveyor or a belt type of conveyor or another type of conveyor as described herein. The type of organics conveyor 42 selected will be dependent on the requirements of the processing site, the trailer 22 selected, the source separated organics 24 to be processed, and the type and size of the organics separation unit 38 to be utilized. The organics conveyor 42 is preferably of sufficient durability to not fracture or fail during the movement of the processed wet organic material 26 and dry organic material 28 from the organics collection hopper 40 to the organics container 56.

In at least one alternative embodiment, the organics conveyor 42 extends outwardly and away from the organics separation unit 38 and outwardly and away from one of the opposite sides of the trailer 22.

In some embodiments, the organics conveyor 42 is mechanically, retractably and/or pivotally connected to the bottom of the organics collection hopper 40. Alternatively, one end of the organics conveyor 42 may be attached to the trailer 22 proximate to the bottom of the organics collection hopper 40. The organics conveyor 42 may rotate outwardly from, and may drop or descend downwardly relative to, the level of either the bottom of the organics collection hopper 40 or the level surface of the trailer 22. In at least one alternative embodiment the organics conveyor 42 extends outwardly from, and has a reach to the exterior of, one of the opposite sides of the trailer 22 and mobile method of processing organics and system 20.

The organics conveyor 42 is preferably operated in synergy, and is adjusted or set to match the operational performance or speed of the infeed conveyor 36, organics separation unit 38, inorganics waste conveyor 44, and the pumping system 46 (if provided). The control panel 48 may be used to initiate, disengage or adjust any operational status of the organics conveyor 42, including the setting of the speed or the change of the speed of operation.

In at least one alternative embodiment the organics conveyor 42 may also include a wet kit attachment located on the lower, tail, and/or idle end of the organics conveyor 42. The wet kit attachment may be used to directly transfer wet organic material 26 in liquid form directly to the organics container 56. The idle end of the organics conveyor 42 may have an American National Standards Institute compliant flanged hose connection 54 for coupling of a hose 94 to an onboard pumping system 46, for the transfer of liquid source separated organics 24 material accumulating at the lowest elevation of the organics conveyor 42.

The inorganics outlet chute 90 preferably traverses the opposite end of the body 66 of the organics separation unit 38 as compared to the infeed inlet 88. In one embodiment the inorganics outlet chute 90 may be located proximate to the bottom of the body 66 of the organics separation unit 38. In another embodiment, the inorganics outlet chute 90 may be located centrally relative to, or proximate to the top of the body 66 of the organics separation unit 38. The location of the inorganics outlet chute 90 will be dependent upon the requirements of a particular application and the source separated organics 24 to be processed by the mobile method of processing organics and system 20.

In at least one embodiment the inorganics outlet chute 90 is permanently welded to the end wall of the body 66. The size dimensions selected for the inorganics outlet chute 90 may vary dependent upon the requirements of a particular application and the source separated organics 24 to be processed by the mobile method of processing organics and system 20.

In at least one preferred embodiment, the speed of the rotation of the horizontal shaft 70 and paddles 72 significantly reduces the size of the inorganic material 30 within the organics separation unit 38. Inside the organics separation unit 38 air turbulence causes the processed and reduced separated inorganic material 30 to pass outwardly through the inorganics outlet chute 90 and onto the inorganics waste conveyor 44.

The inorganics waste conveyor 44 moves the separated inorganic material 30 to a waste inorganics container 58 which is positioned exterior to the trailer 22 and mobile method of processing organics and system 20.

The inorganics waste conveyor 44 may be a screw conveyor or a belt type conveyor or another type of conveyor as described herein. The type of inorganics waste conveyor 44 selected will be dependent on the requirements of the processing site, the trailer 22 selected, the source separated organics 24 to be processed, and the type and size of the organics separation unit 38 to be utilized. The inorganics waste conveyor 44 is preferably of sufficient durability to not fracture or fail during the movement of the processed inorganic material 30 from the inorganics outlet chute 90 to the waste inorganics container 58.

In at least one alternative embodiment, the inorganics waste conveyor 44 extends outwardly and away from the organics separation unit 38 and outwardly and away from one of the opposite sides of the trailer 22.

In at least one embodiment, the inorganics waste conveyor 44 is driven by a variable speed electric motor which is connected to the inorganics waste conveyor 44 by a belt drive. Alternatively the inorganics waste conveyor 44 may be driven by a hydraulic system. The type of variable speed electric motor and belt drive for the inorganics waste conveyor 44 is preferably similar to the other variable speed electric motors and belt drives as described herein. The variable speed electric motor for the inorganics waste conveyor 44 is in electrical communication with, and is regulated by, the control panel 48.

In some embodiments, the inorganics waste conveyor 44 is mechanically, retractably and/or pivotally connected to the opposite end of the organics separation unit 38. The inorganics waste conveyor 44 may rotate outwardly from, and may drop or descend downwardly relative to, the level of either the bottom of the organics separation unit 38 or the surface of the trailer 22.

The inorganics waste conveyor 44 is preferably operated in synergy, and is adjusted or set to match the operational performance of the infeed conveyor 36, organics separation unit 38, organics conveyor 42, and the pumping system 46. The control panel 48 may be used to set or adjust any operational status of the inorganics waste conveyor 44 such as the speed, change of speed, startup, and/or shutdown.

In some embodiments, the control panel 48 is in electrical and operational communication with, and is used to initiate and to shut down, the infeed conveyor 36, the organics separation unit 38, the organics conveyor 42, the inorganics waste conveyor 44, and/or the pumping system 46. The control panel 48 may also be used to regulate the speed of processing through, and the operational speed of, the infeed conveyor 36, the organics separation unit 38, the organics conveyor 42, the inorganics waste conveyor 44, and/or the pumping system 46. The operational speed and/or throughput of the source separated organics 24 through the individual processing components of the mobile method of processing organics and system 20 will be dependent upon the material to be processed and separated into recovered wet organic material 26 and/or dry organic material 28 and recovered inorganic material 30, or dependent upon the specific requirements of the particular application or environment.

It should be noted that the control panel 48 may initiate or shut down the infeed conveyor 36, the organics separation unit 38, the organics conveyor 42, the inorganics waste conveyor 44, and/or the pumping system 46 in any desired order as required by a particular application and/or material to be processed.

In at least one embodiment the control panel 48 is the sole location for the initiation and termination of the operation of the mechanical elements of the mobile method of processing organics and system 20. An operator of the mobile method of processing organics and system 20 will interface with the control panel 48 in order to adjust the infeed rates of the infeed conveyor 36, the rotational speed of the organics separation unit 38 and the speed of the organics conveyor 42 and inorganics waste conveyor 44, as well as the initiation and termination of the pumping system 46.

The control panel 48 may be in communication with an onsite power source and electrical power may flow through the control panel 48 to the infeed conveyor 36, the organics separation unit 38, the organics conveyor 42, the inorganics waste conveyor 44, as well as the pumping system 46. Alternatively, the control panel 48 may be in communication with an onboard electrical generator 62 and electrical power may flow from the control panel 48 to the infeed conveyor 36, the organics separation unit 38, the organics conveyor 42, the inorganics waste conveyor 44, as well as the pumping system 46.

In an alternative embodiment, one or more of the infeed conveyor 36, the organics separation unit 38, the organics conveyor 42, the inorganics waste conveyor 44, as well as the pumping system 46 may individually, or in any combination, receive electrical power directly from an onsite power source. In this embodiment, the control panel 48 may be in electrical communication with each of the infeed conveyor 36, the organics separation unit 38, the organics conveyor 42, the inorganics waste conveyor 44, as well as the pumping system 46 to regulate the operational parameters of each of the electrically powered elements of the mobile method of processing organics and system 20.

In an alternative embodiment, one or more of the infeed conveyor 36, the organics separation unit 38, the organics conveyor 42, the inorganics waste conveyor 44, as well as the pumping system 46 may individually, or in any combination, receive electrical power directly from an onboard generator 62. In this embodiment, the control panel 48 may be in electrical communication with each of the infeed conveyor 36, the organics separation unit 38, the organics conveyor 42, the inorganics waste conveyor 44, as well as the pumping system 46 to regulate the operational parameters of each of the electrically powered elements of the mobile method of processing organics and system 20.

In a preferred embodiment the control panel 48 will be secured to the trailer 22 at a convenient location. The control panel 48 may also include regulatory approved safety elements and procedures such as a light/horn beacon to alert individuals as to the initiation of any of electrically powered elements of the mobile method of processing organics and system 20. The control panel 48 may also include variable frequency drives (VFD) or hydraulic manifolds which are used to adjust the operational performance of one or more of the infeed conveyor 36, the organics separation unit 38, the organics conveyor 42, the inorganics waste conveyor 44, as well as the pumping system 46.

In at least one embodiment electrical power may be supplied to the infeed conveyor 36, the organics separation unit 38, the organics conveyor 42, the inorganics waste conveyor 44, and/or the pumping system 46 from a gasoline or diesel electric onboard generator 62 as secured to the trailer 22 for use in processing locations where a facility electrical power source is not readily available.

In at least one embodiment the onboard generator 62 will be secured to the trailer 22 at a convenient location. The onboard generator 62 will receive fuel from a fuel storage container located on the trailer 22. Fuel storage will occur at a location compliant with department of transportation standards and requirements. The onboard generator 62 may be a kilowatt sized generator. It should be noted that not all mobile method of processing organics and systems 20 include an onboard generator 62 due to considerations which may include cost, site requirements, or the availability of on-site power. If an onboard generator 62 is included on a mobile method of processing organics and system 20, then the onboard generator 62 will be the first element of electrical equipment which is initiated following the transportation of the trailer 22 and mobile method of processing organics and system 20 to a processing location.

In one embodiment, the pumping system 46 will transfer any liquid or slurry portion of the wet organic material 26, which may not be transportable by the organics conveyor 42, to the organics container 56. The suction side of the pumping system 46 may be connected with a non-collapsible hose 94 which in turn is connected to, and is in fluid flow communication with, the idle end of the organics conveyor 42 located below the curved perforated plates or punch screens 76. The liquid or slurry portion of the wet organic material 26 will drop and flow downwardly from the organics separation unit 38 through the curved perforated plates or punch screens 76 and will collect on the lowest portion of the slightly upwardly inclined organics conveyor 42.

The hose 94 may be mounted on the side of the organics conveyor 42 at the idle end, and will be in fluid flow communication with the accumulated fluid and slurry wet organic material 26 within the infeed hopper 34 or the organics collection hopper 40. The hose 94 and hose connectors may be a ANSI flange with an attached hose.

The liquids or slurry portion of the wet organic material 26 may be pumped directly to either an onboard storage tank 102 or external storage tank 102 located at the source separated organics 24 processing site.

The pumping system 46 will include a pump 86 at the suction side proximate to the idle end of the organics conveyor 42. A discharge hose 94 will extend to the storage tank 102 and may include a quick disconnect fitting or quick connect coupling such as a Camlock®. The pumping system 46 will be in electrical communication and controlled by the control panel 48 which may include an exterior on/off push button located on the panel or programmable logic controller display.

The organics container 56 is preferably positioned to one of the opposite sides of the trailer 22 to facilitate movement to another processing location for recovery and reuse of the processed and recovered wet organic material 26 and dry organic material 28.

The waste inorganics container 58 is preferably positioned to one of the opposite sides of the trailer 22 to facilitate movement to another processing location for recovery and reuse of the inorganic material 30.

In one alternative embodiment the mobile method of processing organics and system 20 may be equipped with onboard collection totes 96 on the trailer 22. The onboard collection totes 96 may be used as storage for the recovered wet organic material 26, including any liquid or slurry fraction and/or dry organic material 28.

The onboard collection totes 96 may be intermediate sized bulk containers or other rigid style plastic or metal totes. The onboard collection totes 96 may be placed on a ground surface for filling with the wet organic material 26 or dry organic material 28 and then placed onto the trailer 22 for transportation. Alternatively, the onboard collection totes 96 may be filled with wet organic material 26 or dry organic material 28 while remaining on the trailer 22. The pumping system 46 may be used to assist in filling of the onboard collection totes 96. The size and shape of any onboard collection totes 96 may vary dependent on the design of the mobile method of processing organics and system 20 and the requirements of a source separated organics 24 processing site.

In at least one embodiment, onboard collection totes 96 on the trailer 22 may be used to stage, store, or supply liquids to assist, clean or enhance the processing capability for the mobile method of processing organics and system 20 of the source separated organics 24 material.

In one alternative embodiment, one or more onboard water tanks 80 are transported by the trailer 22, and is used as a supply of water to clean the mobile method of processing organics and system 20 prior to relocation to another processing site. Cleaning of the mobile method of processing organics and system 20 occurs in order to mitigate odors and/or minimize the dropping of material onto a roadway.

In one alternative embodiment the onboard water tanks 80 may be used to add moisture to the wet organic material 26 or dry organic material 28 to form a slurry for pumping by the pumping system 46 to an organics container 56 or onboard collection tote 96.

The onboard water tanks 80 may be an intermediate sized bulk container which may be formed of plastic, metal, fiberglass, composite and other materials and combinations of materials as desired for a particular application. The onboard water tanks 80 may be placed on a ground surface for filling with water and then placed onto the trailer 22 for transportation. Alternatively, the onboard water tanks 80 may be filled with water while remaining on the trailer 22. The pumping system 46 may be used to assist in filling of the onboard water tanks 80 with water.

The size and shape of the onboard water tanks 80 may vary dependent on the design of the mobile method of processing organics and system 20 and the requirements of a processing site.

In at least one embodiment, the onboard water tank 80 on the trailer 22 may be used to store or supply liquids to assist in the cleaning or to enhance the processing capability of the mobile method of processing organics and system 20.

In at least one embodiment the mobile method of processing organics and system 20 will include a collection pan 84 which is directly above the surface of the trailer 22 and is positioned below the infeed conveyor 36, organics separation unit 38, organics collection hopper 40, idle end of the organics conveyor 42 and inorganics waste conveyor 44. The collection pan 84 collects fluid and/or water which has been used to clean the infeed conveyor 36, organics separation unit 38, organics collection hopper 40, organics conveyor 42 and inorganics waste conveyor 44. The cleansing of the infeed conveyor 36, organics separation unit 38, organics collection hopper 40, organics conveyor 42 and inorganics waste conveyor 44 minimizes odor residue upon the mobile method of processing organics and system 20.

In some embodiments the collection pan 84 may include a top grate platform and a bottom formed tray. The top grate platform may be constructed from a plastic, non-slip, and commercially available grating material. The top grate platform may also be repositionable and easily removed by an operator if desired. Further, the top grate platform may be provided in sections to facilitate repositioning.

The bottom formed tray of the collection pan 84 will be below the top grate platform. The bottom formed tray may be inclined or sloped to facilitate liquid accumulation at a common collection point. A ball valve may be positioned proximate to the collection point to assist in the accumulation, removal and storage of the fluids used in the cleaning of the infeed conveyor 36, organics separation unit 38, organics collection hopper 40, organics conveyor 42 and inorganics waste conveyor 44. Alternatively, a quick disconnect fitting or quick connect coupling such as a Camlock® may be positioned proximate to the collection point to assist in the accumulation, removal and storage of the fluids used in the cleaning of the infeed conveyor 36, organics separation unit 38, organics collection hopper 40, organics conveyor 42 and inorganics waste conveyor 44.

In another embodiment the ball valve or the quick disconnect fitting or quick connect coupling may be in fluid flow communication with a hose 94 which extends downwardly from the collection point of the collection pan 84 to a drain at a facility processing site.

In one embodiment an onboard cleaning system 78 may be used to clean the infeed conveyor 36, organics separation unit 38, organics collection hopper 40, organics conveyor 42 and inorganics waste conveyor 44. The cleaning system 78 may include one or more hoses 94 which are in fluid flow communication with the onboard water tanks 80 and a pressure washer having a pump and spray wand. The infeed conveyor 36, organics separation unit 38, organics collection hopper 40, organics conveyor 42 and inorganics waste conveyor 44 may then be cleaned through the use of pressurized water or other cleaning fluids.

The quick disconnect fitting or quick connect coupling may be in fluid flow communication with the onboard pump 86 and used for transfer of cleaning fluids captured by the collection pan 84 into a storage tank 102.

As may be seen in FIG. 6, in at least one embodiment, the mobile method of processing organics and system 20 will include a retractable cover system 60 which at least partially may be formed of tarp. The retractable cover system 60 may fully or partially cover the trailer 22 and components of the mobile method of processing organics and system 20. The retractable cover system 60 will protect the components of the mobile method of processing organics and system 20 from the elements and provide for some security protection.

The specifications and dimensions for the retractable cover system 60 may vary, and at a minimum will be sufficiently large to completely enclose the components of the infeed hopper 34, infeed conveyor 36, organics separation unit 38, organics collection hopper 40, organics conveyor 42, inorganics waste conveyor 44, pumping system 46, onboard generator 62 and the control panel 48. The retractable cover system 60 may also be sufficiently large to completely enclose the components of the cleaning system 78, onboard water tank 80, onboard collection totes 96 and storage tank 102 as well as any additional or remaining components of the mobile method of processing organics and system 20.

The retractable cover system 60 may be withdrawn from a covering position over the desired components of the mobile method of processing organics and system 20 by either a manual, electrical or a hydraulic powered system. The retractable cover system 60 may include a rigid internal support structure which may slide within mounted tracks located proximate to the opposite longitudinal sides of the trailer edge. The retractable cover system 60 may also be secured in a covering position or configuration through the use of security straps. In one embodiment, an operator may manually detach the security straps and then push the rigid internal support structure to slide the enclosure within the mounted tracks forwardly towards a vehicle or trailer hitch area of the trailer 22.

It is anticipated that the components of the mobile method of processing organics and system 20 will not extend outwardly from the perimeter of a Department of Transportation (DOT) approved trailer body and will satisfy all DOT guidelines and regulations.

The retractable cover system 60 preferably protects the components of the mobile method of processing organics and system 20 from exposure to adverse environmental conditions. Alternatively, the components of the mobile method of processing organics and system 20 may be entirely confined within a standard shipping container.

Figure 11:
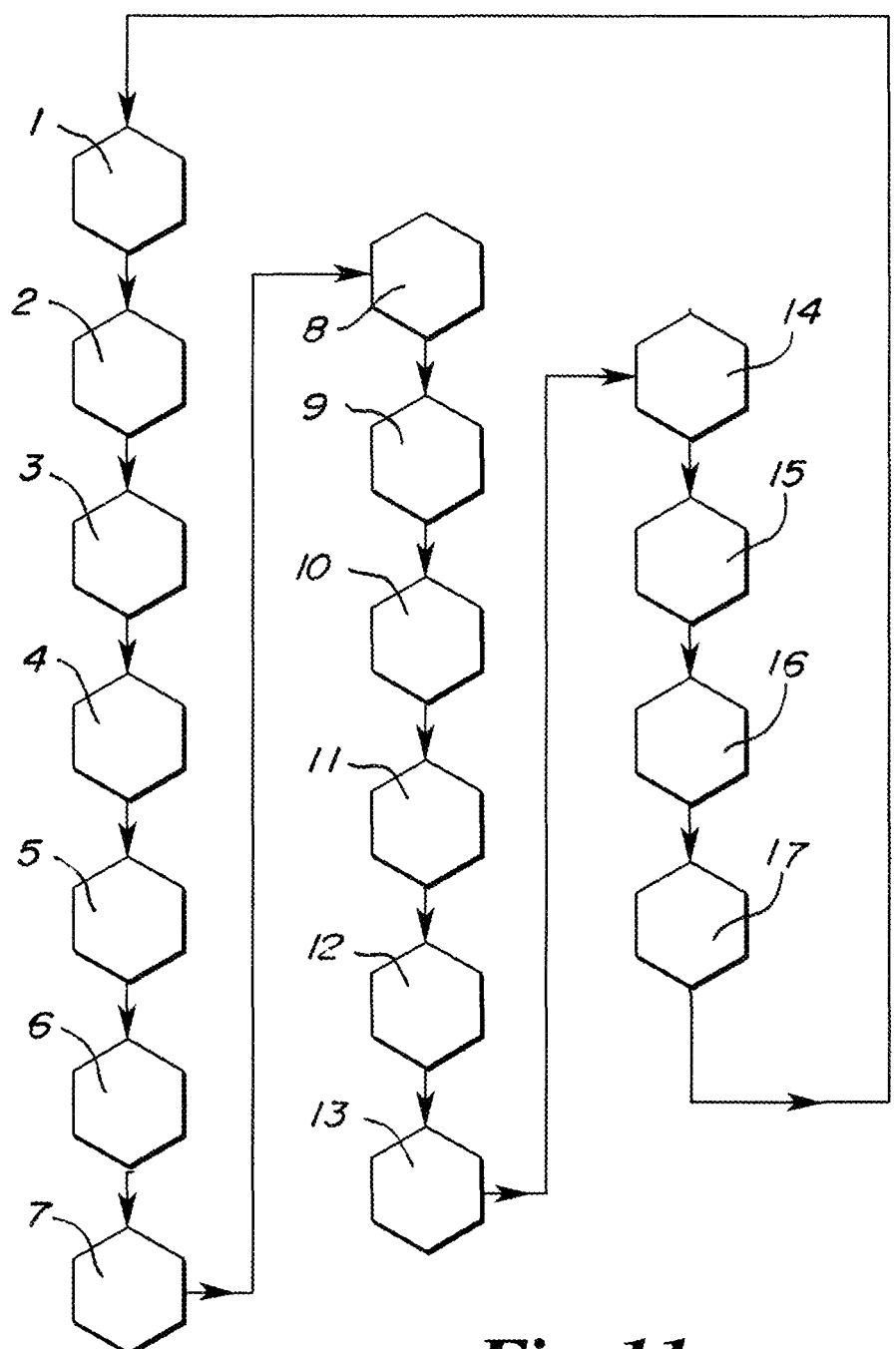
FIG. 11 is a block diagram of one alternative embodiment of the mobile method of processing organics and system.

Referring to FIG. 11, in one embodiment, the mobile method of processing organics and system 20 is initiated by the movement of the trailer 22 to a processing site of source separated organics 24 material. The relocation of the trailer 22 between processing sites of source separated organics 24 material is represented by reference numeral 1 within the block diagram of FIG. 11.

Reference numeral 2 within the block diagram of FIG. 11 represents the uncoupling and the withdraw of the retractable cover system 60 from a covering position to an uncovered position exposing the components of the mobile method of processing organics and system 20. Following the positioning of the retractable cover system 60 into an open position, further setup and use of the components of the mobile method of processing organics and system 20 may occur in the processing of source separated organics 24 material.

Reference numeral 3 within the block diagram of FIG. 11 represents the simultaneous or sequential positioning of the infeed hopper 34, infeed conveyor 36, organics conveyor 42, inorganics waste conveyor 44, coupling of the hose connections 54, placement of the organics container 56 and placement of the waste inorganics container 58 into an operative location for processing of source separated organics 24 material. It also should be noted that the actions taken as identified by reference numeral 3 may occur in any desired order or randomly at the discretion of an individual or based on the requirements of a processing location for the source separated organics 24 material.

Reference numeral 4 within the block diagram of FIG. 11 represents the provision of electrical power from a facility electrical power source to the infeed conveyor 36, organics separation unit 38, organics conveyor 42, inorganics waste conveyor 44, pumping system 46, control panel 48, cleaning system 78 and pump 86. Reference numeral 4 within the block diagram of FIG. 11 alternatively represents the provision of electrical power from an onboard generator 62 electrical power source to the infeed conveyor 36, organics separation unit 38, organics conveyor 42, inorganics waste conveyor 44, pumping system 46, control panel 48, cleaning system 78 and pump 86.

Reference numeral 4 within the block diagram of FIG. 11 also represents the establishment of operational/control communication between the infeed conveyor 36, organics separation unit 38, organics conveyor 42, inorganics waste conveyor 44, pumping system 46, cleaning system 78 and pump 86 and the control panel 48.

It also should be noted that the actions taken as identified by reference numeral 4 may occur simultaneously, sequentially, in any desired order, in any desired combination or randomly at the discretion of an individual or based on the requirements of a processing location for the source separated organics 24 material.

Reference numeral 5 within the block diagram of FIG. 11 represents the manipulation of the control panel 48 to initiate operation of the infeed conveyor 36, organics separation unit 38, organics conveyor 42, inorganics waste conveyor 44, pumping system 46 and pump 86 if required.

It also should be noted that the actions taken as identified by reference numeral 5 may occur simultaneously, sequentially, in any desired order, in any desired combination or randomly at the discretion of an individual or based on the requirements of a processing location for the source separated organics 24 material.

Reference numeral 6 within the block diagram of FIG. 11 represents the placement of the unprocessed, unseparated or raw source separated organics 24 into the infeed hopper 34. The placement of the unprocessed, unseparated or raw source separated organics 24 into the infeed hopper 34 may occur manually or through the use of equipment, machinery or vehicles as identified herein, including, but not limited to, the use of a skid steer or front end loader.

Reference numeral 7 within the block diagram of FIG. 11 represents the movement of the unprocessed, unseparated or raw source separated organics 24 from the infeed hopper 34 and into the organics separation unit 38 through the use of the infeed conveyor 36 as describe herein. The alternative embodiments for the infeed conveyor 36 have been previously described.

Reference numeral 8 within the block diagram of FIG. 11 represents the processing of the source separated organics 24 within the organics separation unit 38 which may be a turbo separator. The details of the processing of the source separated organics 24 within organics separation unit 38 have been previously identified. Reference numeral 8 in the block diagram of FIG. 11 also represents the passage of the separated wet organic material 26 (which may also be liquid) and dry organic material 28 through the organics collection hopper 40 and into the organics conveyor 42, and from the organics conveyor 42 to an organics container 56.

In an optional step, water from the onboard water tank 80 may be used to add moisture to the wet organic material 26 or dry organic material 28 being processed within the organics separation unit 38 to form an organic slurry. The organic slurry may be pumped by the pumping system 46 from the organics conveyor 42 to an organics container 56 or onboard collection tote 96.

Reference numeral 9 within the block diagram of FIG. 11 represents the processing and passage of the separated inorganic material 30 onto the inorganics waste conveyor 44, and from the inorganics waste conveyor 44 to a waste inorganics container 58.

Reference numeral 10 within the block diagram of FIG. 11 represents the manipulation of the control panel 48 to adjust the operational performance or speed of the operation of the infeed conveyor 36, organics separation unit 38, organics conveyor 42, inorganics waste conveyor 44, pumping system 46 and pump 86 if required.

It also should be noted that the actions taken as identified by reference numeral 10 may occur simultaneously, sequentially, in any desired order, in any desired combination at the discretion of an individual or based on the processing of the source separated organics 24 material passing through the mobile method of processing organics and system 20.

Reference numeral 11 within the block diagram of FIG. 11 represents the manipulation of the control panel 48 to terminate the operation of the infeed conveyor 36, organics separation unit 38, organics conveyor 42, inorganics waste conveyor 44, pumping system 46 and pump 86 if required.

It also should be noted that the actions taken as identified by reference numeral 11 may occur simultaneously, sequentially, in any desired order, in any desired combination or randomly at the discretion of an individual or based on the requirements of a processing location for the source separated organics 24 material.

Reference numeral 12 within the block diagram of FIG. 11 represents the disconnection of electrical power from a facility electrical power source to the infeed conveyor 36, organics separation unit 38, organics conveyor 42, inorganics waste conveyor 44, pumping system 46, control panel 48 and pump 86. Reference numeral 12 within the block diagram of FIG. 11 alternatively represents the disconnection of the electrical power from an onboard generator 62 electrical power source to the infeed conveyor 36, organics separation unit 38, organics conveyor 42, inorganics waste conveyor 44, pumping system 46, control panel 48 and pump 86.

Reference numeral 12 within the block diagram of FIG. 11 also represents the disconnection of operational/control communication between the infeed conveyor 36, organics separation unit 38, organics conveyor 42, inorganics waste conveyor 44, pumping system 46 and pump 86 from the control panel 48.

It also should be noted that the actions taken as identified by reference numeral 12 may occur simultaneously, sequentially, in any desired order, in any desired combination or randomly at the discretion of an individual or based on the requirements of a processing location for the source separated organics 24 material.

Reference numeral 13 within the block diagram of FIG. 11 represents the simultaneous or sequential retraction of the infeed hopper 34, infeed conveyor 36, organics conveyor 42, inorganics waste conveyor 44, uncoupling of the hose connections 54, transportation of organics container 56 and removal of the waste inorganics container 58 into an stored location for repositioning to another processing site of source separated organics 24 material. It also should be noted that the actions taken as identified by reference numeral 13 may occur in any desired order or randomly at the discretion of an individual or based on the requirements of a processing location for the source separated organics 24 material.

Reference numeral 14 within the block diagram of FIG. 11 represents the use of the onboard cleaning system 78 to clean the infeed conveyor 36, organics separation unit 38, organics collection hopper 40, organics conveyor 42 and inorganics waste conveyor 44 following the completion of the processing of the source separated organics 24 material. The cleaning of the infeed conveyor 36, organics separation unit 38, organics collection hopper 40, organics conveyor 42 and inorganics waste conveyor 44 will begin with the opening of any valve to provide access to the onboard water tank 80 and the flow of water from the onboard water tank 80 through the hose(s) 94 to the pressure washer. The pressure washer is activated and an individual may use a spray wand to pressure wash the components of the infeed conveyor 36, organics separation unit 38, organics collection hopper 40, organics conveyor 42 and inorganics waste conveyor 44. Additional cleaning fluids may be used in addition to water.

A collection pan 84 may be positioned on the surface of the trailer 22 below the organics separation unit 38, infeed conveyor 36, organics collection hopper 40, organics conveyor 42 and inorganics waste conveyor 44. The collection pan 84 may include an inclined surface and may be used to accumulate free liquids from the cleaning activities at a collection point. A quick disconnect fitting or quick connect coupling for a hose 94 may be coupled to a valve or drain for the collection pan 84. An onboard pump 86 may be used for the transfer of accumulated cleaning fluids to a storage tank 102.

Reference numeral 15 within the block diagram of FIG. 11 represents the deactivation of the onboard cleaning system 78 and deactivation of the onboard pump 86. Any valve for the onboard water tank 80 may be closed and any hose(s) 94 may be disconnected from one or more of the onboard water tank 80, onboard pump 86 and/or pressure washer 82 and stored at a suitable location on the trailer 22. In addition any quick disconnect fitting or quick connect coupling for a hose 94 may be uncoupled from the collection pan 84 and stored. The opening or valve providing access to the storage tank 102 is also closed.

Reference numeral 16 within the block diagram of FIG. 11 represents the disconnection of any power cable which may have been used to provide power to the onboard pump 86 and/or pressure washer.

Reference numeral 17 within the block diagram of FIG. 11 represents the return of the retractable cover system 60 from a uncovered position to a covered position enclosing the components of the mobile method of processing organics and system 20 beneath the retractable cover system 60.

Following the positioning of the retractable cover system 60 into a covered position, the trailer 22 and mobile method of processing organics and system 20 may be transported and relocated to another site for processing of source separated organics 24, whereupon the above described actions/procedures may be duplicated.

It should be noted that the any of the actions to be taken or procedures as identified by any reference numeral herein may occur prior to, simultaneously with, or following any other action identified or procedure identified by any other reference numeral, and that the order of the actions identified herein is not restrictive. To the extent permissible any action identified by any reference numeral may be taken prior to, or following, any the actions required by any other reference numeral.

In a first embodiment, a method of processing organics where the method includes the steps of moving a trailer to a location having source separated organics to be processed, the trailer transporting an infeed hopper, an infeed conveyor, an organics separation unit, an organics conveyor, an inorganics waste conveyor, and a control panel, the control panel regulating the operation of the infeed conveyor, the organics separation unit, the organics conveyor and the inorganics waste conveyor; loading the source separated organics into the infeed hopper; activating from the control panel the infeed conveyor transferring the source separated organics from the infeed hopper to the organics separation unit; processing and separating the source separated organics into recovered organics and recovered inorganics within the organics separation unit; passing the recovered organics onto the organics conveyor; discharging the recovered inorganics onto the inorganics waste conveyor; transferring the recovered organics to an organics container by the organics conveyor; and transferring the recovered inorganics to a waste inorganics container from the inorganics waste conveyor.

In a second alternative embodiment according to the first embodiment, the infeed conveyor, the organics separation unit, the organics conveyor and the inorganics waste conveyor each have operational parameters wherein the control panel regulates at least one of the operational parameters for the infeed conveyor, the organics separation unit, the organics conveyor and the inorganics waste conveyor.

In a third alternative embodiment according to the second embodiment, the method further includes the step of positioning the organics conveyor outwardly from the trailer.

In a fourth alternative embodiment according to the third embodiment, the method further includes the step of positioning the inorganics waste conveyor outwardly from the trailer.

In a fifth alternative embodiment according to the fourth embodiment, the method further includes the step of reducing the initial size of the source separated organics within the infeed conveyor.

In a sixth alternative embodiment according to the fourth embodiment, the method further includes the step of installing in the organics separation unit at least one curved perforated plates or punch screens having a plurality of openings and rotating a horizontal shaft having paddles within the organics separation unit, reducing the source separated organics into inorganic material and at least one of wet organic material and dry organic material.

In a seventh alternative embodiment according to the sixth embodiment the method further includes the step of dropping at least one of the wet organic material and the dry organic material from the organics separation unit through the plurality of openings into an organics collection hopper.

In an eighth alternative embodiment according to the seventh embodiment, the method further includes the step of transferring the inorganic material from the organics separation unit through an inorganics outlet chute onto the inorganics waste conveyor.

In a ninth alternative embodiment according to the eighth embodiment, the method further includes the step of transporting on the trailer an onboard pumping system, an onboard generator, an onboard water tank holding water, a collection pan, at least one hose, and a storage tank.

In a tenth alternative embodiment according to the ninth embodiment, the method further includes the step of transferring a portion of the water from the onboard water tank into the organics separation unit and processing at least one of wet organic material and dry organic material into an organic slurry.

In an eleventh alternative embodiment according to the tenth embodiment, the method further includes the step of dropping the organic slurry from the organics separation unit through the organics collection hopper and into the organics conveyor.

In a twelfth alternative embodiment according to the eleventh embodiment, the method further includes the step of pumping the organics slurry from the organics conveyor into the organics container.

In a thirteenth alternative embodiment according to the ninth embodiment, the method further includes the step of transporting on the trailer a cleaning system comprising a pressure washer.

In a fourteenth alternative embodiment according to the thirteenth embodiment, the method further includes the step of transferring a portion of the water from onboard water tank to the pressure washer and spraying the portion of the water onto at least one of the infeed hopper, the infeed conveyor, the organics separation unit, the organics conveyor, and the inorganics waste conveyor following processing of the source separated organics.

In a fifteenth alternative embodiment according to the fourteenth embodiment, the method further includes the step of positioning of at least one collection pan below at least one of the infeed hopper, the infeed conveyor, the organics separation unit, the organics conveyor, and the inorganics waste conveyor prior to the spraying of the portion of the water, the at least one collection pan collecting the sprayed water.

In a sixteenth alternative embodiment according to the fifteenth embodiment the method further includes the step of connecting the at least one hose to the at least one collection pan and pumping of the collected sprayed water from the at least one collection pan to the storage tank.

In a seventeenth alternative embodiment according to the sixteenth embodiment, the method further includes the step of retracting the organics conveyor onto the trailer.

In an eighteenth alternative embodiment according to the seventeenth embodiment, the method further includes the step of retracting the inorganics waste conveyor onto the trailer.

In a nineteenth alternative embodiment according to the eighteenth embodiment, the method further includes the step of activating a retractable cover system engaged to the trailer and covering the infeed hopper, the infeed conveyor, the organics separation unit, the organics conveyor, the inorganics waste conveyor, and the control panel following processing of the source separated organics.

In a twentieth alternative embodiment according to the second embodiment, the method further includes the step of the control panel communicates an adjustment of the operational parameters to a variable speed infeed conveyor motor powering the infeed conveyor, regulating a speed setting for the infeed conveyor.

In a twenty-first alternative embodiment according to the second embodiment, the method further includes the step of the control panel communicates an adjustment of the operational parameters to a variable speed organics separation unit motor powering the organics separation unit, regulating a speed setting for the organics separation unit.

In a twenty-second alternative embodiment according to the second embodiment, the method further includes the step of the control panel communicates an adjustment of the operational parameters to a variable speed organics conveyor motor powering the organics conveyor, regulating a speed setting for the organics conveyor.

In a twenty-third alternative embodiment according to the second embodiment, the method further includes the step of the control panel communicates an adjustment of the operational parameters to a variable speed inorganics conveyor motor powering the inorganics conveyor, regulating a speed setting for the inorganics conveyor.

In a twenty-fourth alternative embodiment according to the second embodiment, the method further includes the step of the control panel communicates adjustment of the operational parameter for the organics separation unit, increasing a volume of air turbulence and movement of the recovered inorganics into engagement with the inorganics waste conveyor.

In a twenty-fifth alternative embodiment according to the sixth embodiment, the method further includes the step of adjusting a length dimension of a paddle face from the horizontal shaft.

In a twenty-sixth alternative embodiment according to the sixth embodiment, the method further includes the step of adjusting a separation distance between at least one pair of adjacent paddles of the plurality of paddles.

In a twenty-seventh alternative embodiment according to the sixth embodiment, the method further includes the step of adjusting an angle of at least one of the plurality of paddles relative to the horizontal shaft.

In a twenty-eighth alternative embodiment according to the sixth embodiment, the method further includes the step of adjusting an angle of at least one of the plurality of paddles relative to another of the plurality of paddles.

In a twenty-ninth alternative embodiment according to the sixth embodiment, the method further includes the step of angularly aligning a first set of the plurality of paddles relative to the horizontal shaft.

In a thirtieth alternative embodiment according to the sixth embodiment, the method further includes the step of angularly aligning a first set of the plurality of paddles relative to a second set of the plurality of paddles, forming an angularly offset grouping of paddles between the first set and the second set.

In a thirty-first alternative embodiment according to the sixth embodiment, the method further includes the step of replacing at least one of said at least one curved perforated plates or punch screen with a second punch screen to increase or decrease a size dimension for at least one of the plurality of openings.

In a thirty-second alternative embodiment according to the sixth embodiment, the method further includes the step of replacing at least one of the at least one curved perforated plates or punch screens to alter a shape for at least one of the plurality of openings.

In a thirty-third alternative embodiment, a mobile organics processing system includes a relocatable device, the relocatable device being constructed and arranged to process source separated organics into recovered organics and recovered inorganics, the relocatable device having an infeed hopper, the infeed hopper receiving the source separated organics, an infeed conveyor disposed below the infeed hopper, the infeed conveyor transporting the source separated organics to an organics separation unit, the organics separation unit comprising a turbo separator, the turbo separator having an end, the turbo separator processing the source separated organics into the recovered organics and the recovered inorganics, the recovered organics falling from the organics separation unit into an organics collection hopper, the recovered inorganics exiting the end onto an inorganics waste conveyor, the inorganics waste conveyor transporting the recovered inorganics to a recovered inorganics waste discharge location, the recovered inorganics waste discharge location not being integral to the relocatable device.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

With respect to the above description, it is to be realized that the optimum dimensional relationships for the parts of the invention, to include variations in size, materials, shape, form, function and manner of operation, assembly and use, are deemed to be within the expertise of those skilled in the art, and all equivalent structural variations and therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of processing organics said method comprising:
    moving a trailer to a location having source organics to be processed, the trailer transporting and utilizing an infeed hopper, an infeed conveyor, a turbo separator having paddles, an organics conveyor, an inorganics waste conveyor, and a control panel, said control panel regulating the operation of said infeed conveyor, said turbo separator, said organics conveyor and said inorganics waste conveyor;
    loading said source organics into said infeed hopper;
    activating from said control panel said infeed conveyor transferring said source organics from said infeed hopper to said turbo separator;
    processing and separating said source organics into recovered organics and recovered inorganics within said turbo separator,
    passing said recovered organics onto said organics conveyor;
    discharging said recovered inorganics onto said inorganics waste conveyor;
    transferring said recovered organics to an organics container by said organics conveyor, said recovered organics comprising at least a portion of wet organic material; and
    transferring said recovered inorganics to a waste inorganics container from said inorganics waste conveyor.

2. The method of claim 1, wherein at least one of said infeed conveyor, said turbo separator, said organics conveyor and said inorganics waste conveyor have at least one operational speed parameter wherein said control panel regulates said at least one operational speed parameter during processing of said source organics.

3. The method of claim 2, further comprising positioning said organics conveyor outwardly from said trailer.

4. The method of claim 3, further comprising positioning said inorganics waste conveyor outwardly from said trailer.

5. The method of claim 4, further comprising reducing initial size of at least a portion of said source organics within said infeed conveyor.

6. The method of claim 4, further installing in said turbo separator at least one curved perforated plate or punch screen having a plurality of openings and rotating a horizontal shaft having said paddles within said turbo separator reducing said source organics into said recovered inorganics and said recovered organics.

7. The method of claim 6, further comprising dropping said recovered organics from said turbo separator through said plurality of openings into an organics collection hopper.

8. The method of claim 7, further comprising transferring said recovered inorganics from said turbo separator through an inorganics outlet chute onto said inorganics waste conveyor.

9. The method of claim 8, further comprising transporting on said trailer an onboard pumping system, an onboard generator, an onboard water tank holding water, a collection pan, at least one hose, and a storage tank.

10. The method of claim 9, further comprising transferring a portion of said water from said onboard water tank into said turbo separator and processing said recovered organics into an organic slurry.

11. The method of claim 10, further comprising dropping said organic slurry from said turbo separator through said organics collection hopper and into said organics conveyor.

12. The method of claim 11, further comprising pumping said organics slurry from said organics conveyor into said organics container.

13. The method of claim 9, further comprising transporting on said trailer a cleaning system comprising a pressure washer.

14. The method of claim 13, further comprising transferring a portion of said water from said onboard water tank to said pressure washer and spraying said portion of said water onto at least one of said infeed hopper, said infeed conveyor, said turbo separator, said organics conveyor, and said inorganics waste conveyor following processing of said source organics.

15. The method of claim 14, further comprising positioning of said collection pan below at least one of said infeed hopper, said infeed conveyor, said turbo separator, said organics conveyor, and said inorganics waste conveyor prior to said spraying of said portion of said water, said collection pan collecting said sprayed water.

16. The method of claim 15, further comprising connecting said at least one hose to said collection pan and pumping of collected sprayed water from said collection pan to said storage tank.

17. The method of claim 16, further comprising retracting said organics conveyor onto said trailer.

18. The method of claim 17, further comprising retracting said inorganics waste conveyor onto said trailer.

19. The method of claim 18, further comprising activating a retractable cover system engaged to said trailer and covering said infeed hopper, said infeed conveyor, said turbo separator, said organics conveyor, said inorganics waste conveyor, and said control panel following processing of said source organics.

20. A method of processing organics said method comprising:
    moving a trailer to a location having source organics to be processed, the trailer transporting and utilizing an infeed hopper, an infeed conveyor, a turbo separator having paddles, an organics conveyor, an inorganics waste conveyor, and a control panel, said control panel regulating the operation of said infeed conveyor, said turbo separator, said organics conveyor and said inorganics waste conveyor;
    loading said source organics into said infeed hopper;

activating from said control panel said infeed conveyor transferring said source organics from said infeed hopper to said turbo separator;

processing and separating said source organics into recovered organics and recovered inorganics within said turbo separator;

passing said recovered organics onto said organics conveyor;

discharging said recovered inorganics onto said inorganics waste conveyor;

transferring said recovered organics to an organics container by said organics conveyor, said recovered organics comprising at least a portion of wet organic material;

transferring said recovered inorganics to a waste inorganics container from said inorganics waste conveyor;

wherein said infeed conveyor, said turbo separator, said organics conveyor and said inorganics waste conveyor each have at least one operational speed parameter, wherein said control panel regulates said at least one operational speed parameter during processing of said source organics;

positioning said organics conveyor outwardly from said trailer;

positioning said inorganics waste conveyor outwardly from said trailer;

reducing the initial size of said source organics within said infeed conveyor; and installing in said turbo separator at least one curved perforated plate or punch screen having a plurality of openings and rotating a horizontal shaft having said paddles within said turbo separator reducing said source organics into said recovered inorganics and said recovered organics.

* * * * *